Patented Aug. 27, 1946

2,406,558

UNITED STATES PATENT OFFICE 2,406,558

ACRYLIC RESINS

Henry T. Neumann, New York, N. Y., assignor of one-third to Leon G. Arpin, Montclair, N. J., and one-third to Edward L. Symonds, Jackson Heights, N. Y.

No Drawing. Application December 10, 1943, Serial No. 513,713

3 Claims. (Cl. 260—9)

This invention relates to acrylic resins and, more particularly, to making a by-product from acrylic resin scrap.

The principal object of the invention is to provide a speedy, inexpensive and simple method of making a by-product from acrylic resin scrap formed during the manufacture of acrylic resin parts.

Another object of the invention is to make as a by-product from acrylic resin scrap an organic solution from which there is deposited upon evaporation of the solvent a substance capable of serving as an improved cement, filler, binder, coating or the like.

A further object of the invention is to provide an improved organic cement capable of highly effectively bonding articles made of acrylic resins and which may be simply modified to bond well with articles made of materials such as cellulose acetate and cellulose nitrate.

Another object of the invention is to provide a novel organic filler for fibrous articles which renders the articles self-form-maintaining to a high degree, shock-proof, water impervious, and decorative.

Another object of the invention is to provide an improved flexible wear-resistant lacquer the transparency of whose resultant coating can be easily controlled.

Other objects of this invention will in part be obvious and in part hereinafter pointed out.

The invention contemplates making a by-product from scrap resins such as acrylic and methacrylic acids, their esters, amides, salts, halides and nitriles. More particularly the invention is concerned with making a by-product from the scrap acrylic resin known as "Lucite," i. e., polymeric methyl methacrylate resin.

Basically I carry out the invention by dissolving the acrylic resin, such as Lucite, in a volatile organic solvent which may consist either of a single solvent or a mixture of two or more organic solvents. The resulting solution of Lucite in an organic solvent may be applied to surfaces to be cemented or coated, or impregnated in a fibrous material and allowed to dry whereupon a solid substance will be deposited whose degree of translucency will vary in accordance with the composition of the organic solution.

More specifically I dissolve the Lucite scrap in benzene. When this organic solution of Lucite is applied to an exposed surface, the benzene will evaporate and deposit a horny, solid substance which is not Lucite although it resembles the same. For example, this deposited substance, which will hereinafter be referred to as the "deposit product," is much softer than Lucite. Also, it is more flexible. These two qualities render the deposit product a highly desirable cement, filler and lacquer.

Although benzene by itself will dissolve Lucite scrap in time, when used alone the dissolving proceeds rather slowly. I have found that the concomitant use of alcohol greatly accelerates the dissolving action. Typical alcohols effective for this purpose are alcohols of the aliphatic saturated series which are soluble in benzene. Examples of these are: methyl alcohol, ethyl alcohol, propyl alcohol, butyl alcohol, amyl alcohol, hexyl alcohol, laury alcohol, cetyl alcohol, and stearyl alcohol.

The methyl and ethyl alcohols are particularly useful since they greatly facilitate the dissolving action and are obtainable commercially at a very low price. It should be noted that these saturated aliphatic alcohols are not capable by themselves of dissolving Lucite. By way of example, and without in any way limiting myself thereto, the following is a good example of a solvent for dissolving Lucite in accordance with my invention:

Ethyl alcohol ---------------------- cc-- 2000
Benzene ---------------------------- cc-- 7000

This quantity of the composite solvent can be used to dissolve about half a kilogram of Lucite. It is also capable of dissolving larger quantities of scrap, but the resulting organic solution of polymeric methyl methacrylate resin will be more viscous. If the above 9000 cc. of solvents is used to dissolve 454 gms. of scrap, the resulting solution will have the viscosity of molasses.

Preferably the Lucite scrap is first immersed in the alcohol, then the benzene is added. If the procedude is reversed, that is, if the Lucite is first added to the benzene and then alcohol is introduced, a cottony precipitate will be formed of the scrap already in solution. Of course, this cottony precipitate can be redissolved, but this requires additional time. If the alcohol is first added and then the benzene, from one to two hours will be required to dissolve the 454 gms. of scrap. The process may be carried out at ordinary room temperatures. After the Lucite is dissolved, it is desirable to allow the viscous solution to stand a while to permit homogenization thereof.

This solution is one of the end products obtained from the reclamation of the Lucite scrap. It can be used as a cement or as a bond for substances which may be softened by the solvent.

For example, this solution forms an excellent bond for uniting Lucite parts.

I have found upon tests that where two thin Lucite sheets are united by the foregoing solution the sheets fail before the bond.

The solution can also be adapted for use as a bond for organic materials other than Lucite by adding another solvent to the already formed solution, which solvent has the property of softening the material with which the solution is to be used. Thus if glacial acetic acid is added to the solution, the resulting new solution is an excellent bond for substances such as cellulose acetate and cellulose nitrate. The quantity of glacial acetic acid to be added can be quite widely varied.

I have found that highly satisfactory results are obtained where the glacial acetic acid is about ten percent by volume of the original composite solvent. If desired, larger amounts of glacial acetic acid can be employed, but it must be borne in mind that there will be a greater softening of the material. Where less than ten per cent of glacial acetic acid is used, a poorer bond is formed.

The bonding action of my novel solution on substances such as cellulose acetate and cellulose nitrate can be further enhanced by adding other softening solvents, in addition to the glacial acetic acid. Such another solvent is acetone, which can be added in the amount of about two percent of the original solution by volume. Here care should be exercised not to add much more than two per cent of acetone; otherwise a cottony precipitate will be formed.

If desired, the characteristics of the deposit product may be modified to render the bond more flexible by adding plasticizers, examples of which are dimethyl phthalate, dibutyl tartrate, lactic acid, phenolpthalein, and tricresyl phosphate.

My improved solution, when applied to a surface exposed to air, dries very quickly and thus rapidly leaves a thin film of the deposit product. In some instances this is not desirable, that is, the speed of drying is too rapid, and under such conditions it is preferable to introduce into the solution a reagent for retarding drying. Any of the foregoing plasticizers will function satisfactorily as retardants.

Another and very efficient retardant is zinc chloride. With the latter the solution will take from about one-half to two hours to dry and properly set.

I have mentioned above that where it was desired to increase or decrease the viscosity of the solution more or less Lucite scrap should be dissolved in a solution comprising a fixed ratio of two or more solvents. This is contrary to ordinary practice in dissolving organic compounds wherein, if a less viscous solution is employed, it is common to add more of the dissolving agent only; in this instance benzene, rather than to increase the amounts of both the benzene and alcohol, that is, of the dissolving agent and the accelerating agent. The reason for this is that I have found that where the ratio between the alcohol and benzene is varied, the transparency of the deposit product varies correspondingly. Where benzene alone is used, the deposit product is perfectly clear and transparent. When alcohol is also employed up to the proportion mentioned in the foregoing specific example, that is, two parts out of a total of nine, the deposit product is still perfectly clear and transparent. However, as the ratio increases, the deposit product becomes first cloudy and finally opaque. Where the ratio is reversed—7000 cc. of alcohol to 2000 cc. of benzene—the deposit product is quite opaque, although its flexibility and softness are not materially affected.

Where my novel solution is employed in closing packages of food, it is desirable to prevent dirt and extraneous matter present in the scrap from being carried over into the solution. Particularly is this necessary where such dirt dissolves in the solvents employed in my solution.

To this end Lucite may be dissolved in my novel solvent, precipitated as by adding water, and the precipitate then redissolved in a fresh solution which includes benzene. Such fresh solution may also include alcohol as described above.

Alternatively I may employ, for the purpose of removing the impurities, a solution of acetic acid, acetic anhydride and sulphuric acid, which will dissolve Lucite and from which the same can likewise be precipitated by the addition of water.

My novel solution of Lucite can be employed also as a lacquer. If the solution is unpigmented with the alcohol and benzene in the above specified proportions, the lacquer will be clear and uncolored. Suitable pigments, of course, may be added. If an opaque or semi-opaque lacquer is desired, the proportions of alcohol and benzene may be changed accordingly. The lacquer thus obtained is extremely flexible and is thus very desirable, since it will not chip and will not break when the surface to which it is applied is repeatedly or sharply bent.

My solution of Lucite can also be used for fabricating self-form-maintaining fibrous articles from raw materials which are essentially limp, such as paper and cloth. To make a paper article, a sheet of paper is coated with the solution and the same allowed to soak into the paper, or the sheet may be immersed in the solution, withdrawn and the excess solution allowed to run off. The surface of the sheet is then permited to dry and the sheet is processed to bring it into the desired shape, such as a paper cup, embossed license plate, etc. After shaping, the paper is permitted to set. If zinc chloride is used as the retardant, in about one-half to two hours full setting will result. The paper article is light, resilient and will not chip. It is also strong and impervious to moisture, although flexible enough not to break easily.

Quite often the acrylic resin scrap includes foreign matter of a cellulosic nature such as a paper backing and it may be inconvenient to remove such matter by filtering. I have found that removal of cellulosic matter may be accomplished by chemical treatment and the treated matter incorporated in the organic solution of the acrylic resin without in any way affecting the characteristics of said solution. Elimination of the cellulosic matter is accomplished as follows:

A mass of the scrap, including, for example, scrap with a paper backing, is placed in a crock and enough of a five to ten percent solution of sodium sulphide is poured into the crock to immerse the scrap. The scrap is allowed to stand in this solution for from two to twenty-four hours. The sodium sulphide solution is then poured off and the scrap in the crock submersed in a five to ten per cent solution of sodium bisulfite. The scrap is permitted to stand in this second solution for from two to three hours after which it is poured out and the scrap washed in water to clear off excess salts. The scrap is then dried whereupon it is ready for dissolution in the composite solvent hereinabove described.

The sodium sulphide gelatinizes the cellulosic matter, in this instance the paper backing, the sodium bisulfite sets the gelatinized backing and the water renders the backing opaque. After treatment with the sodium sulphide, sodium bisulfite and water, none of which affect the acrylic resin scrap, the cellulosic matter is soluble in the composite solvent along with the acrylic resin scrap and the resulting solution will have the same physical and chemical characteristics as the solution of the acrylic resin alone.

It will thus be seen that I have provided a method of making, as a by-product from Lucite scrap, an organic solution capable of many useful applications and which achieves the stated objects of my invention.

As various possible embodiments might be made of the above invention, and as various changes might be made in the embodiments above set forth, it is to be understood that all matter herein set forth is to be interpreted as illustrative and not in a limiting sense.

Having thus described my invention, I claim as new and desire to secure by Letters Patent:

1. A method of utilizing scrap polymeric methyl methacrylate resin including cellulosic matter comprising treating the same for from about 2 to 24 hours in a solution of from about 5 to 10% of sodium sulphide, next treating the same for about from 2 to 3 hours in a solution of from about 5 to 10% of sodium bisulphite, washing the same in water, and then dissolving the scrap and treated cellulosic matter in benzene and a monohydric alcohol of the saturated aliphatic series.

2. A method of utilizing scrap polymeric methyl methacrylate resin including cellulosic matter comprising treating the same for from about 2 to 24 hours in a solution of from about 5 to 10% of sodium sulphide, next treating the same for about from 2 to 3 hours in a solution of from about 5 to 10% of sodium bisulphite, washing the same in water, drying the same, and then dissolving the scrap and treated cellulosic matter in benzene and a monohydric alcohol of the saturated aliphatic series.

3. A method of utilizing scrap polymeric methyl methacrylate resin including cellulosic matter comprising immersing the same in a solution of from about 5 to 10% of sodium sulphide, letting the same stand in said solution for from about 2 to 24 hours, next immersing the same in a solution of from about 5 to 10% of sodium bisulphite and allowing the same to stand in said last named solution for from about 2 to 3 hours, washing the same in water, drying the same, and then dissolving the scrap and treated cellulosic matter in benzene and a monohydric alcohol of the saturated aliphatic series.

HENRY T. NEUMANN.